(12) United States Patent
Sun et al.

(10) Patent No.: US 8,369,225 B2
(45) Date of Patent: Feb. 5, 2013

(54) NETWORK TESTING PROVIDING FOR CONCURRENT REAL-TIME INGRESS AND EGRESS VIEWING OF NETWORK TRAFFIC DATA

(75) Inventors: Ethan Sun, Woodland Hills, CA (US); Dean Lee, Woodland Hills, CA (US); Rajesh Paramasivan, Thousand Oaks, CA (US); Victor Alston, Oak Park, CA (US)

(73) Assignee: Ixia, Calabasas, CA (US)

( * ) Notice: Subject to any disclaimer, the term of this patent is extended or adjusted under 35 U.S.C. 154(b) by 149 days.

(21) Appl. No.: 12/565,657

(22) Filed: Sep. 23, 2009

(65) Prior Publication Data

US 2011/0069626 A1    Mar. 24, 2011

(51) Int. Cl.
*H04L 12/26* (2006.01)
(52) U.S. Cl. ........................ 370/241; 709/224
(58) Field of Classification Search .......... 370/241, 370/251, 252; 709/223, 224
See application file for complete search history.

(56) References Cited

U.S. PATENT DOCUMENTS

| | | | |
|---|---|---|---|
| 5,450,394 A | 9/1995 | Gruber | |
| 5,568,471 A | 10/1996 | Hershey et al. | |
| 5,627,766 A | 5/1997 | Beaven | |
| 5,850,386 A | 12/1998 | Anderson et al. | |
| 5,850,388 A | 12/1998 | Anderson et al. | |
| 5,905,713 A | 5/1999 | Anderson et al. | |
| 5,974,237 A | 10/1999 | Shurmer et al. | |
| 5,974,457 A | 10/1999 | Waclawsky | |
| 6,108,800 A | 8/2000 | Asawa | |
| 6,233,256 B1 | 5/2001 | Dieterich et al. | |
| 6,279,124 B1 | 8/2001 | Brouwer | |
| 6,397,359 B1 | 5/2002 | Chandra et al. | |
| 6,430,617 B1 | 8/2002 | Britt | |
| 6,446,121 B1 | 9/2002 | Shah | |
| 6,526,259 B1 | 2/2003 | Ho | |
| 6,578,077 B1* | 6/2003 | Rakoshitz et al. | 709/224 |
| 6,717,917 B1 | 4/2004 | Weissberger et al. | |
| 6,816,903 B1* | 11/2004 | Rakoshitz et al. | 709/226 |
| 6,826,259 B2 | 11/2004 | Hoffman | |
| 7,031,264 B2 | 4/2006 | Adhikari et al. | |
| 7,082,463 B1* | 7/2006 | Bradley et al. | 709/223 |
| 7,099,438 B2 | 8/2006 | Rancu et al. | |
| 7,123,616 B2 | 10/2006 | Weissberger et al. | |
| 7,304,958 B2* | 12/2007 | Nelson et al. | 370/249 |
| 7,467,192 B1* | 12/2008 | Lemler et al. | 709/223 |
| 7,561,559 B2 | 7/2009 | Hannel et al. | |
| 7,680,925 B2* | 3/2010 | Sathyanarayana et al. | 709/224 |
| 7,840,664 B2* | 11/2010 | Dugatkin et al. | 709/224 |
| 7,881,221 B2* | 2/2011 | Arad et al. | 370/252 |
| 2002/0073228 A1 | 6/2002 | Cognet et al. | |
| 2003/0069952 A1 | 4/2003 | Tams | |
| 2004/0177142 A1 | 9/2004 | Pepper | |

(Continued)

OTHER PUBLICATIONS

IXIA Communications, IxExplorer User's Guide, Revision 2.1.0, Nov. 1, 1999, pp. 1-384.

(Continued)

*Primary Examiner* — Kerri Rose
(74) *Attorney, Agent, or Firm* — SoCal IP Law Group LLP; Mark A. Goldstein; Steven C. Sereboff

(57) ABSTRACT

There is disclosed a system and method for implementing concurrent real-time ingress and egress viewing of network traffic data to evaluate the performance of a device under test. The method may be performed by a network testing system.

17 Claims, 15 Drawing Sheets

U.S. PATENT DOCUMENTS

2004/0236866 A1 11/2004 Dugatkin et al.
2006/0262729 A1 11/2006 Chau et al.
2007/0025261 A1 2/2007 Ginsberg et al.
2009/0257354 A1* 10/2009 Hannel et al. ................ 370/241

OTHER PUBLICATIONS

IXIA Communications, Specifications for Load Modules—Multilayer Gigibit Ethernet for LM1000LX, LM1000SX, LM1000GBIC, LM1000T, Product Specification Sheet, 2 pages, Nov. 1999.

IXIA Communications, The Ixia 200 Traffic Generator and Analyzer, Product Description, 199701999, last accessed on Aug. 15, 2003, file://C:/DS/IXIA/Patents/081403/ix200.htm, pp. 1-2.

IXIA Communications, Ixia 200 Chassis, Product Description p. 1, Nov. 1999.

* cited by examiner

NETWORK TESTING PROVIDING FOR CONCURRENT REAL-TIME INGRESS AND EGRESS VIEWING OF NETWORK TRAFFIC DATA

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

1. Field

This disclosure relates to network communications testing providing for concurrent real-time ingress and egress viewing of network traffic data.

2. Description of the Related Art

Networks such as the Internet carry a variety of data communicated using and through a variety of network devices including servers, routers, hubs, switches, load balancers, firewalls, and other devices. Before placing a network into use, the network, including the network devices, network media, network segments and network applications included therein, may be tested to ensure successful operation. Network devices and applications may be tested, for example, to ensure that they function as intended, comply with supported protocols, and can withstand anticipated traffic demands. Such testing may also be performed on already deployed network devices, network segments and network applications.

To assist with the construction, installation and maintenance of networks, network applications and network devices, networks may be augmented with network analyzing devices, network conformance systems, network monitoring devices, and network traffic generators, all which are referred to herein as network testing systems. The network testing systems may allow for analyzing the performance of networks, network applications and network devices by capturing, modifying, analyzing and/or sending network communications. The network testing systems may be used to evaluate how well a network device or network segment handles data communication, streaming media and voice communications. Specifically, a network testing system may allow a user to choose to simulate one or more entities defined by the Session Initiation Protocol (SIP), to simulate real-world VoIP traffic and/or to assess conformance with SIP standards.

DETAILED DESCRIPTION

Description of Apparatus

Figure 1:
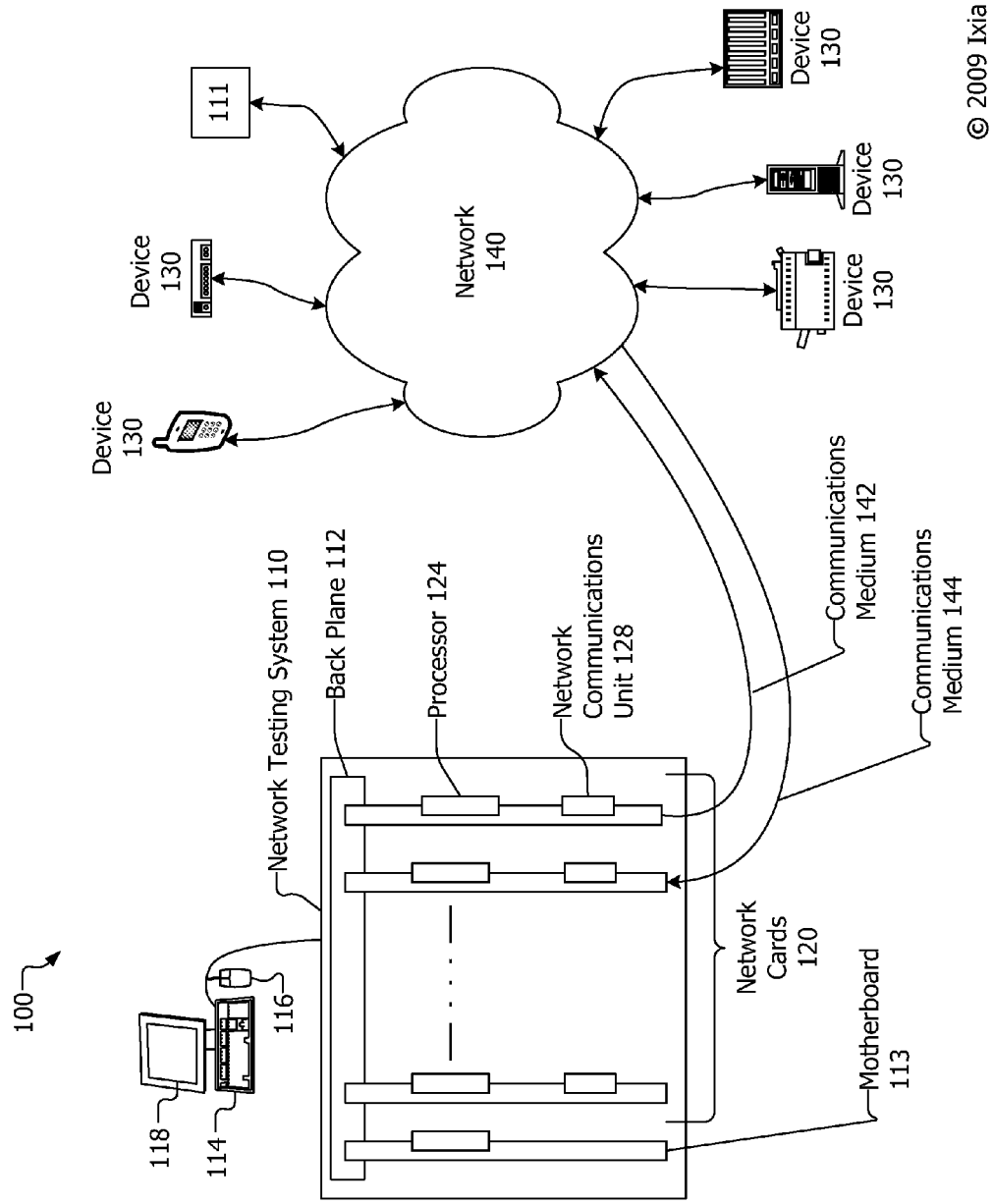
FIG. 1 is a block diagram of an environment in which network testing providing for concurrent real-time ingress and egress viewing of network traffic data may be implemented.

FIG. 1 is a block diagram of an environment in which network testing including control and data plane convergence may be implemented. The environment 100 shows a network testing system 110 in which methods for receiving, processing and executing network tests may be implemented. The network test may be system default tests and may be user modified or user specified. The environment 100 includes network testing system 110 coupled via at least one network card 120 to a network 140 over a communications medium 142 and/or 144. Although only two connections over communications media 142 and 144 are show, there may be additional wired and wireless connections. The network testing system 110 may include or be one or more of a performance analyzer, a conformance validation system, a network analyzer, a packet blaster, a network management system, a combination of these, and/or others.

The network testing system 110 may be used to evaluate or measure characteristics and performance of a network communication medium, a network communications device or system, including the throughput of network traffic, the number of dropped packets, jitter, packet delay, latency, and many others. Such testing may be used to evaluate the Mean Opinion Score (MOS) or R-value score of a voice transmission, a video quality score or rating, a broadband quality score, or other similar media transmission score for a communication over a network or portion thereof and/or through a network communications device. The network testing system may be used to evaluate the performance of servers, network communications devices such as, for example, routers, gateways, firewalls, load balancers, and other network devices, as well as network applications and other software. The network testing system may be used to verify the functionality of network devices and/or conformance of SIP traffic with SIP standards or with vendor or specialized SIP implementations.

The network testing system 110 may be in the form of a chassis or card rack, as shown in FIG. 1, or may be an integrated unit. Alternatively, the network testing system may comprise a number of separate units such as two or more chassis cooperating to provide network analysis, network conformance testing, and other tasks. The chassis of the network testing system 110 may include one or more network cards 120 and a back plane 112. The network cards 120 may be coupled with back plane 112. One or more network cards 120 may be included in network testing system 110. The network cards 120 may be permanently installed in the network testing system 110, may be removable, or may be a combination thereof.

The network testing system 110, the motherboard 113 and/or one or more of the network cards 120 may include an operating system such as, for example, versions of Linux, Unix and Microsoft Windows.

Two of the network cards 120 are shown coupled with network 140 via communications media 142 and 144. Although a two physical connections over communications media 142 and 144 is shown, each of the network cards 120 may be connected with network 140 over a communications medium. In one embodiment, the network cards may have two or more connections each over a communications medium with the network 140 and/or with multiple networks. The communications medium may be, for example, wire lines such as an Ethernet cable, fibre optic cable, and coaxial cable, and may be wireless.

The network testing system 110 and the network cards 120 may support one or more well known higher level (OSI Layers 3-7) communications standards or protocols such as, for example, one or more versions of the User Datagram Protocol (UDP), Transmission Control Protocol (TCP), Internet Protocol (IP), Internet Control Message Protocol (ICMP), Internet Group Management Protocol (IGMP), Stream Control Transmission Protocol (SCTP), Session Initiation Protocol (SIP), Hypertext Transfer Protocol (HTTP), Address Resolution Protocol (ARP), Reverse Address Resolution Protocol (RARP), File Transfer Protocol (FTP), Real-time Transport Protocol (RTP), Real-time Transport Control Protocol (RTCP), Real-Time Streaming Protocol (RTSP), the Media Gateway Control Protocol (MEGACO), the Session Description Protocol (SDP), Border Gateway Protocol (BGP), Enhanced Interior Gateway Routing Protocol (EIGRP), Multiple Spanning Tree Protocol (MSTP), Open Shortest Path First (OSPF), Protocol-Independent Multicast-Sparse Mode (PIM-SM), Intermediate System to Intermediate System (IS-IS or ISIS), Per-VLAN Spanning Tree Plus (PVST+), Rapid Per-VLAN Spanning Tree Plus (RPVST+), and Simple Mail Transfer Protocol (SMTP); may support one or more well known lower level communications standards or protocols (OSI Layers 1-2) such as, for example, the 10 and/or 40 Gigabit Ethernet standards, the Fibre Channel standards, one or more varieties of the IEEE 802 Ethernet standards, Asynchronous Transfer Mode (ATM), X.25, Integrated Services Digital Network (ISDN), token ring, frame relay, Point to Point Protocol (PPP), Fiber Distributed Data Interface (FDDI), Universal Serial Bus (USB), IEEE 1394 (also known as I.link® and Firewire®); may support proprietary protocols; and may support other protocols. Each network card 120 may support a single communications protocol, may support a number of related protocols, or may support a number or combination of unrelated protocols.

The term "network card" as used herein encompasses line cards, test cards, analysis cards, network line cards, load modules, interface cards, network interface cards, data interface cards, packet engine cards, service cards, smart cards, switch cards, relay access cards, CPU cards, port cards, and others. The network cards 120 may be referred to as blades, particularly when a processor is included on the network card.

The network cards 120 may include one or more processors 124 and one or more network communications units 128. In another embodiment, the network cards 120 may have no processors 124 and may include one or more network communications units 128. In the embodiment in which the network cards do not include a processor, processing may be performed by a processor on a motherboard 113 of the network testing system 110, on another card, on the backplane 112 or by a remote or external unit. When the network card 120 includes two or more network communications units 128, the network card 120 is in effect two or more network capable devices. That is, a network card 120 having n network communications units 128 may function as n network capable devices.

The network communications unit 128 may be implemented as one or more field programmable gate arrays (FPGA), application specific integrated circuits (ASIC), programmable logic devices (PLD), programmable logic arrays (PLA), other kinds of devices, and combinations of these. The network communications unit 128 may support one or more communications protocols. The network communications unit 128 may include a network interface through which the network card 120 may transmit and/or receive communications over the network 140.

The network card 120 may include and/or have access to local and/or remote memory, storage media and storage devices. Instructions to be executed by the processor 124 may be stored on and executed from a local or remote machine readable medium or storage device. A machine readable medium includes, for example, without limitation, magnetic media (e.g., hard disks, tape, floppy disks), optical media (e.g., CD, DVD, BLU-RAY DISC®), flash memory products (e.g., memory stick, compact flash and others), and volatile and non-volatile silicon products (e.g., random access memory (RAM), programmable read-only memory (PROM), electronically erasable programmable read-only memory (EEPROM), FPGA and other PLDs, and others). A storage device is a device that allows for the reading from and/or writing to a machine readable medium. Storage devices include hard disk drives, solid-state drives (SSDs), DVD drives, flash memory devices, and others.

The processor 124, network communications unit 128, and memory may be included in one or more FPGAs, PLAs, PLDs on the network card 120. Additional and fewer units, hardware and firmware may be included in the network card 120.

The back plane 112 may serve as a bus or communications medium for the network cards 120. The back plane 112 may also provide power to the network cards 120.

The network testing system 110 may have a computer (not shown) coupled thereto. The computer may be local to or remote from the network testing system 110. The network testing system 110 may have coupled therewith a display 118 and user input devices such as a keyboard 114 and a mouse 116, as well as other user input devices including, for example, pens and trackballs. The user input devices may be coupled to a network card, other card, motherboard, or backplane included in the chassis.

The network testing system 110 may be implemented in a computer such as a personal computer, server, or workstation, as well as the chassis shown. The network testing system 110 may be used alone or in conjunction with one or more other network testing systems 110. The network testing system 110 may be located physically adjacent to and/or remote to the network capable devices 130 in the network 140. The network testing system 110 may be used to test and evaluate the network 140 and/or portions thereof, network capable devices 130, applications running on network capable devices 130, and/or services provided by network 140 and/or network capable devices 130 and/or network applications. The network testing system 110, the network cards 120, and the network communications units 128 may all be network capable devices.

The network 140 may be a local area network (LAN), a wide area network (WAN), a storage area network (SAN), or a combination of these. The network 140 may be wired, wireless, or a combination of these. The network 140 may include or be the Internet. The network 140 may be public or private, may be a segregated test network, and may be a combination of these. The network 140 may be comprised of a single or numerous nodes providing numerous physical and logical paths for packets to travel. Each node may be a network capable device as described below. A node may be a computing device, a data communications device, a network capable device, a network card, or other devices as defined and described herein.

Communications on the network 140 may take various forms, including frames, cells, datagrams, data units, packets, messages, higher level logical groupings, or other units of information, all of which are referred to herein as packets. Those packets that are communicated over a network are referred to herein as network traffic. The network traffic may include packets that represent electronic mail messages, streaming media such as music (audio) and video, telephone (voice) conversations, web pages, graphics, documents, and others. Network traffic may be organized into flows, where a "flow" is any plurality of packets having the same flow identifier contained in each packet. The flow identifier is a unique identifier for a particular group of packets. The flow identifier may be, for example, a dedicated identifier field, an address, a port number, a tag, or some other field or combination of fields within each packet. The flow identifier may include or be a program group identifier or PGID. A network testing system and the network testing software may accumulate and report network traffic statistics on a per flow basis which may be based on the PGID included in packets. A series of packets originating from a single port and having a specific packet type and a specific rate will be referred to herein as a "stream." A source or transmitting port may support multiple outgoing streams simultaneously and concurrently, for example to accommodate multiple packet types, rates, or destinations.

The network capable devices 130 may be devices capable of communicating over the network 140 and/or listening to, injecting, delaying, dropping, relaying, processing, and/or modifying network traffic on network 140. The network capable devices 130 may be computing devices such as computer workstations, personal computers, servers, portable computers, set-top boxes, video game systems, media players such as BLU-RAY DISC® players, personal video recorders, telephones, personal digital assistants (PDAs), computing tablets, and the like; peripheral devices such as printers, scanners, facsimile machines and the like; network capable storage devices including disk drives such as network attached storage (NAS) and SAN devices; testing equipment such as network analyzing devices, network conformance systems, emulation systems, network monitoring devices, and network traffic generators; components such as processors, network cards and network communications units; and networking devices such as routers, relays, firewalls, hubs, switches, bridges, traffic accelerators, and multiplexers. In addition, the network capable devices 130 may include home appliances such as refrigerators, washing machines, and the like as well as residential or commercial heating, ventilation, and air conditioning (HVAC) systems, alarm systems, may also include point of sale systems and bank teller machines, and other devices or systems capable of communicating over a network. One or more of the network capable devices 130 may be devices to be tested and may be referred to as devices or systems under test.

The network testing system 110 may send communications over the network 140 to a or through a network capable device 130. The destination of communications sent by the network testing system 110 may be a device under test such as a network capable device 130, may be the network testing system 110 such as a test between two network cards in the same network testing system 110, and may be a second network testing system 111. The network testing system 111 may be similar to or the same as network testing system 110. The ingress and egress viewing described herein is particularly helpful in viewing information about network traffic when a first network card 120 in the network testing system 110 sends communications over the network 140 to a or through a network capable device 130 that are received by a second network card 120 in the network testing system 110. Similarly, the ingress and egress viewing described herein is particularly helpful in viewing information about network traffic when a first network communications unit in a first network card in the network testing system 110 sends communications over the network 140 and through a network capable device 130 to a second network communications unit on the same network card in the same network testing system.

The methods described herein may be implemented on one or more FPGAs and/or other hardware devices, such as, for example, digital logic devices. The methods described herein may be implemented as software, namely network testing software, running on a network testing system and executed by a processor, such as a processor on a network card or a processor in a motherboard in a network testing system. The network testing software may be stored on a volatile or non-volatile memory device or storage medium included in or on and/or coupled with a computing device, a network testing system, a network card, or other card. The methods may be implemented on one or more network cards 120 in a single network testing system.

The network testing software may provide a graphical user interface that allows users to prepare network tests, view the results of network tests, monitor network traffic, and perform other actions. The network testing software may support or provide access to tests and analysis of network traffic according to a plurality of communications protocols, including higher level and/or lower level communications protocols.

Figure 2:
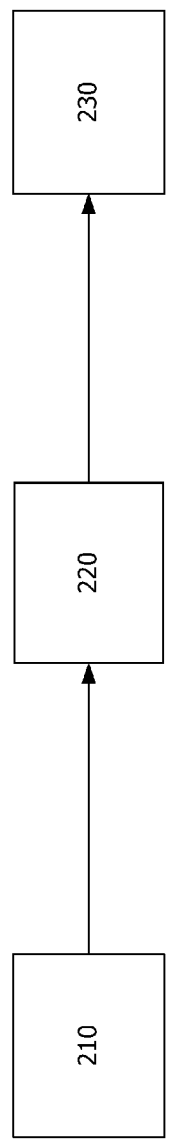
FIG. 2 is a conceptual block diagram of an environment in which network testing providing for concurrent real-time ingress and egress viewing of network traffic data may be implemented.

Referring to FIG. 2, there is shown a conceptual block diagram of an environment in which network testing providing for concurrent real-time ingress and egress viewing of network traffic data may be implemented. The methods described herein are particularly useful with a test like that shown in FIG. 2 involving three network devices, namely two ports 210 and 230 on network cards in a network testing system that communicate through a device under test. 220. FIG. 2 shows a transmitting device 210, a source port, and a receiving device 230, a destination port, that communicate through a device or system under test 220. The device or system under test 220 may be a network capable device that supports various upper level and lower level communications protocols. Examples of a device or system under test 220 include, but are not limited to, routers, bridges, hubs, firewalls, switches and gateways.

As implemented in a network testing system, a transmitting port 210 may communicate over a device or system under 220 test with a receiving port 230. In one embodiment, two ports on two different network cards on a single network testing system each coupled over a network with a device under test may implement the methods described herein. In another embodiment, two ports on a single network card on a single network testing system each coupled over a network with a device under test may implement the methods described herein. Other configurations involving two ports on two chassis are possible.

In one embodiment, a transmit port initiates communications with receive port through the device under test. The transmit port sends network traffic through the device under test to the receive port. The system allows a user to specify a PGID having a user specified size. The PGID size may depend in part on user preference and in part on the protocol being tested. The size of the PGID is measured in bits and may be, for example, from 12 to 64 bits. The PGID has two portions, an ingress part and an egress part. The system allows the user to specify the size of the PGID, the size of the ingress portion, and the size of the egress portion. The user or system specifies the contents of the ingress portion before packets are sent by the transmit port. The device under test fills in the contents of the egress portion which the device under test sends to the receive port. The PGID allows the network testing system software to track groups of flows of packets.

Further, to test the device under test, the device under test must be configured with a quality of service (QoS) remarking policy. A QoS remarking policy takes packets received as part of a first flow and transmits a certain portion of the packets as part of another flow. The remarking may be a mapping from a first terms of service (TOS) value to a second TOS value. The TOS value may be described as "precedence" such that a packet with a lower value has precedence over a packet with a higher value. This is similar to first class postage arriving sooner than third class postage in traditional postal mail. The TOS remarking is typically achieved with a simple mapping table or similar construct in the device under test. For example, flows or streams having TOS values of 1, 2 and 3, may be mapped to flows or streams having TOS values of 4, 6 and 9, respectively, such that packets having a TOS value of 1 are transmitted with a TOS value of 4, packets having a TOS value of 2 are transmitted with a TOS value of 6, and packets having a TOS value of 3 are transmitted with a TOS value of 9. Or packets from a flow having a single stream TOS value of 1 may be distributed in round-robin fashion by the device under test as a flow having three streams, for example, streams having TOS values of 2, 5 and 7. In this example, one third of the packets from the incoming stream having TOS 1 are transmitted as a stream having a TOS of 2, one third of the packets from the incoming stream having TOS 1 are transmitted as a stream having a TOS of 5 and one third of the packets from the incoming stream having TOS 1 are transmitted as a stream having a TOS of 7.

The network test or network device test is used to test the functionality, performance, and/or conformance of the device or system under test. The terms ingress and egress refer to packets from the perspective of the device under test. Information about packets transmitted from the source port 210 and received as incoming packets by the device under test 220 is used to prepare the ingress statistics. Information about packets received by the destination port 230 and transmitted as outgoing packets by the device under test 220 is used to prepare the egress statistics. A user interface provided by the network testing system and shown in FIGS. 13, 14 and 15 displays statistics about ingress and egress packets in real-time, where real-time means immediately or shortly after the occurrence of an event. Depending on the implementation, real-time may be within microseconds, milliseconds, seconds, or tens of seconds, and, in one embodiment is from one to three seconds. The event is typically receipt or transmission of a packet. The network testing system may also provide statistics after the occurrence of various events, at the conclusion of a particular test, for user defined windows or periods of time, or for windows or periods of time representing the beginning and ending of a particular event, such as a simulated or real VOIP call or transmission of a movie, or any number of events or plurality of events, such as establishing and tearing down thousands or millions of VOIP calls.

Figure 3:
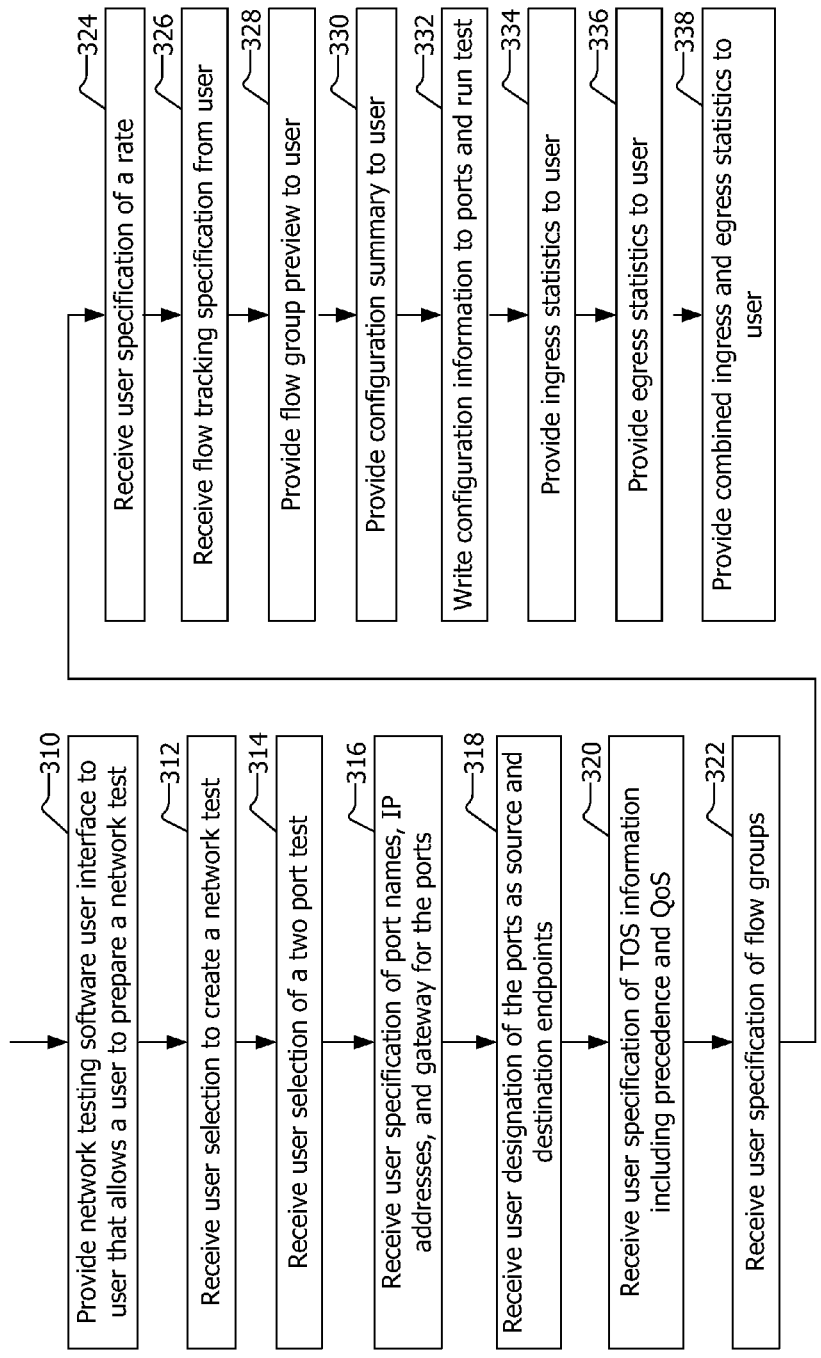
FIG. 3 is a flow chart of actions taken to implement network testing providing for concurrent real-time ingress and egress viewing of network traffic data.

FIG. 3 is a flow chart of actions taken to implement network testing providing for concurrent real-time ingress and egress viewing of network traffic data. To enhance the understanding of the methods described herein, various screen shots of software user interfaces of an example implementation are provided in FIGS. 4-15. The arrangement of user interface items including panes, menus, buttons, sliders, check boxes, etc. shown in the drawings are provided as examples. As described herein, when one user interface construct such as a menu or check box is used, the construct is being shown as an example as other user interface constructs may be used to achieve the same goal. As used herein, user interface constructs include panes, menus, walking menus, pull-down menus, buttons, columns, rows, tables, text, radio buttons, bars, sliders, check boxes, text entry boxes, highlighting, color, and others.

The method described in FIG. 3 may be implemented in software or a combination of software and hardware included in or on the network testing system, including one or more of one or more network cards, a back plane, and/or a motherboard.

Referring to FIG. 3, a network testing software user interface is provided to a user to allow the user to prepare a network test, as shown in block 310. User selection to create a network test is received, as shown in block 312. The network test may allow a user to test the capabilities and performance of a device under test. In one embodiment, to evaluate a device under test, a first port on a network testing system may send data through the device under test to a second port on the network testing system as described above regarding FIG. 2. User selection of a two port test is received, as shown in block 314. The network testing system may also provide support for and allow a user to select to test from one transmit port to multiple receive ports, from multiple transmit ports to a single receive port and from multiple transmit ports to multiple receive ports.

Figure 4:
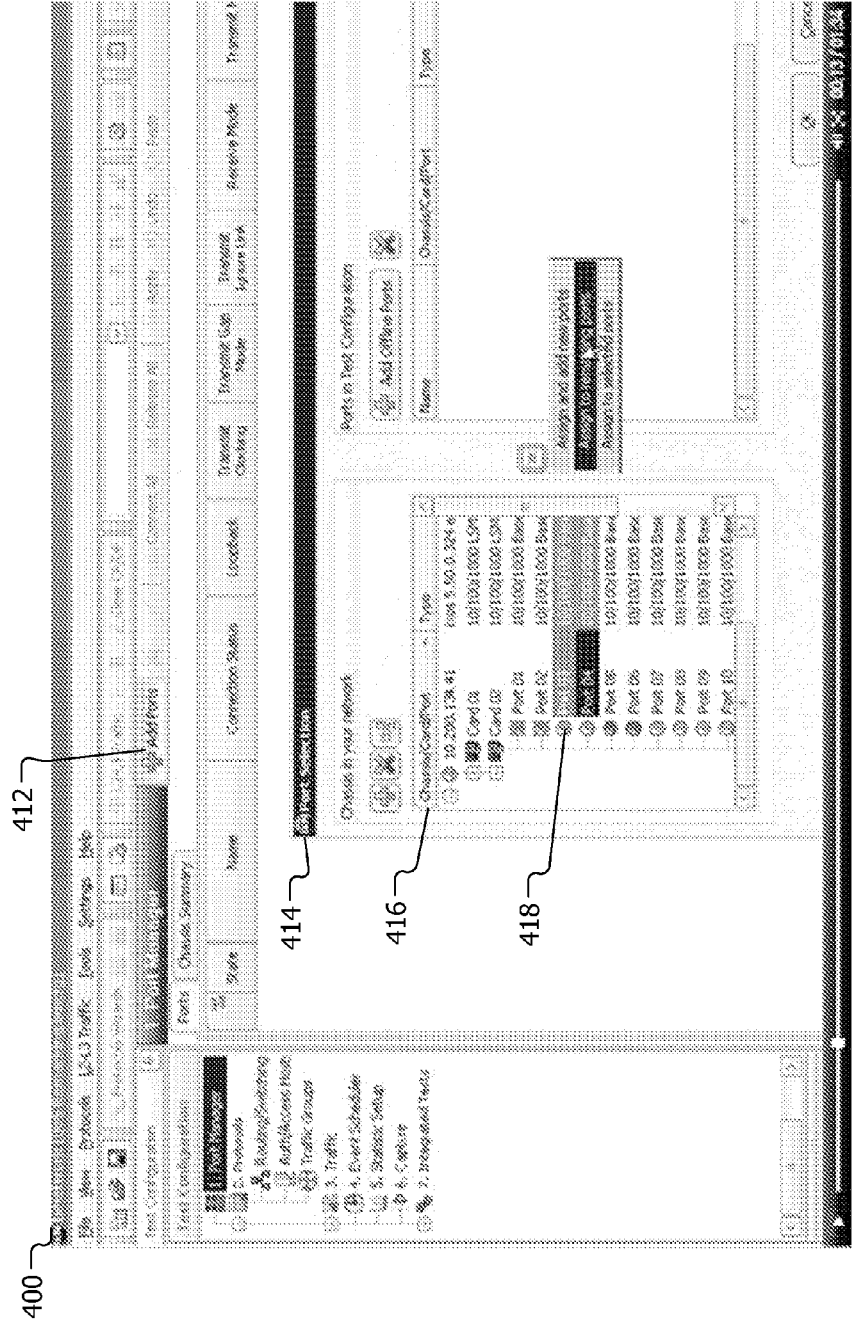
FIG. 4 is a screen shot of an example port selection user interface.

FIG. 4 is a screen shot of a port selection user interface 400. The port selection user interface allows a user to specify that ports should be added to a network test. This may be achieved using a button such as button 412 or other user interface construct. When the button 412 is activated by a mouse click or other user interaction, a port selection window 414 may appear which allows a user to select from available ports 418 on available hardware such as network cards 416 included in the network testing system.

Figure 5:
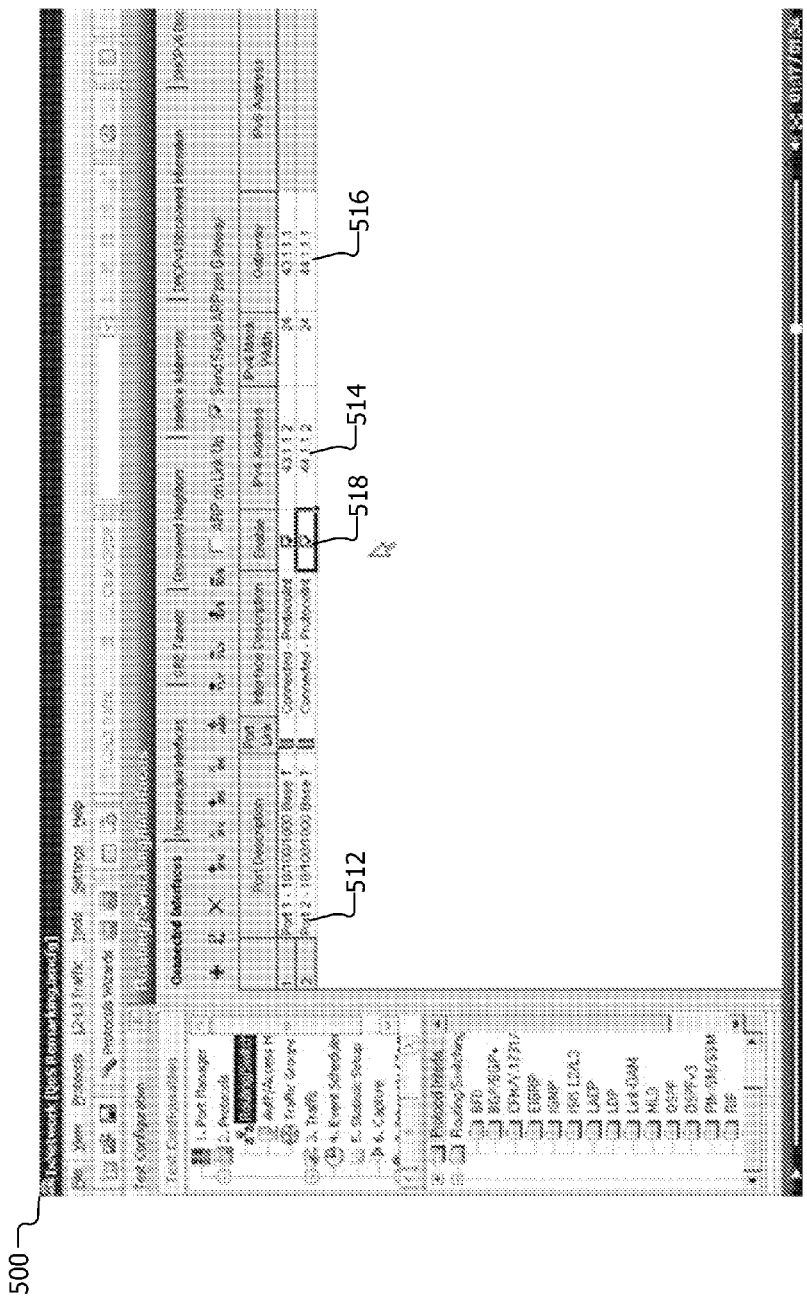
FIG. 5 is a screen shot of an example port specification user interface.

Returning now to a discussion of FIG. 3, user specification of port names, IP addresses, and a gateway for the ports is received, as shown in block 316. FIG. 5 is a screen shot of a port specification user interface 500. In this example, the user selected two ports, and port specification user interface 500 allows a user to name the ports 512, specify the IP addresses for each of the ports, and specify a gateway 516 for the ports. The user interface also allows the user to enable via a check box 518 a simulation for the test.

Figure 6:
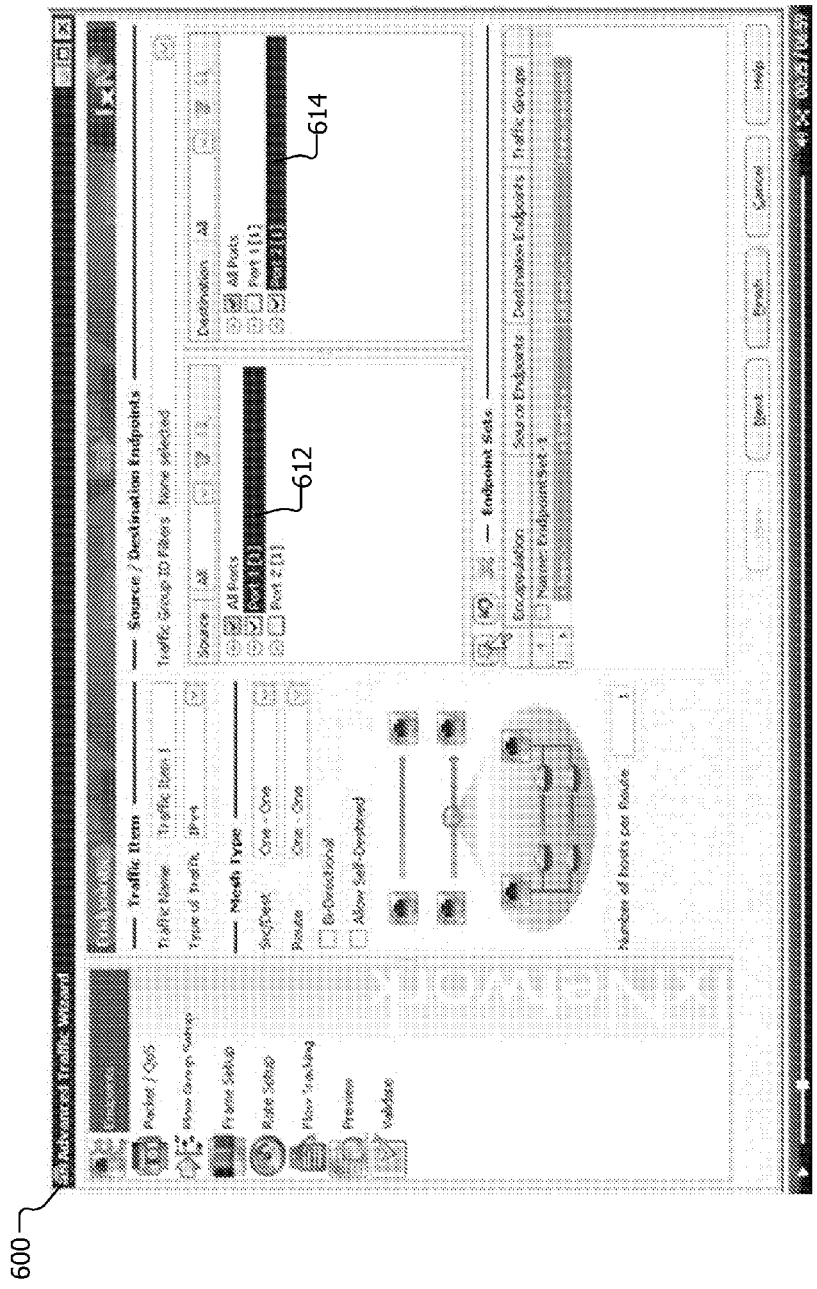
FIG. 6 is a screen shot of an example endpoint designation user interface.

Returning now to a discussion of FIG. 3, user designation of the ports as source and destination endpoints is received, as shown in block 318. FIG. 6 is a screen shot of an endpoint designation user interface 600 which allows a user the option to select which ports will be source endpoints 612 and which ports will be destination endpoints 614. In the example shown, check boxes and are provided to allow a user to select which ports will be source and destination endpoints.

Figure 7:
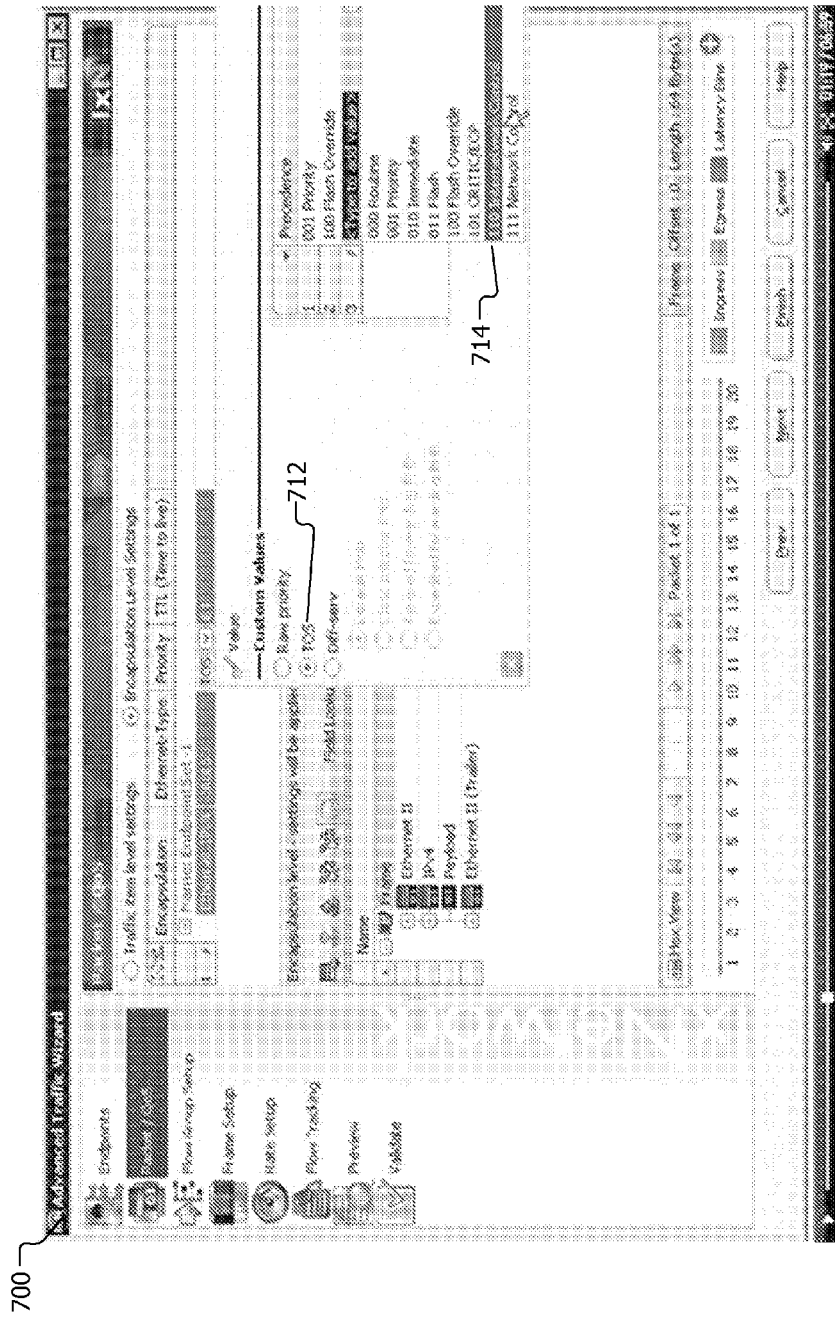
FIG. 7 is a screen shot of an example QoS specification user interface.

Returning now to a discussion of FIG. 3, user specification of QOS information including precedence and TOS is received, as shown in block 320. FIG. 7 is a screen shot of a QoS specification user interface 700 which allows a user to select TOS 712 and specify the TOS value precedence 714 and other pertinent information about the QoS. The user knows how the user configured the device under test, so that the user can select QoS values for the ingress flows that correspond to those provided with the configuration of the device under test.

Figure 8:
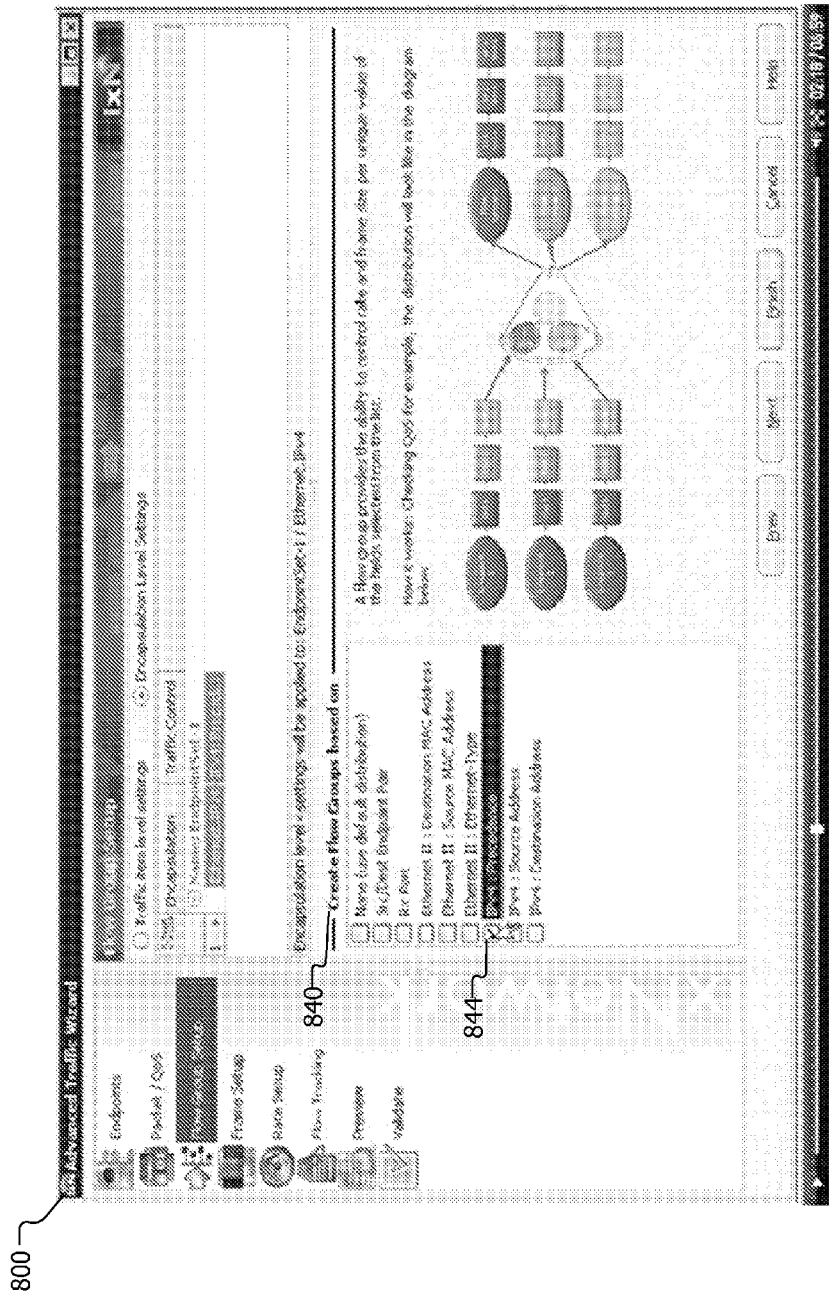
FIG. 8 is a screen shot of an example flow group user interface.

Returning now to a discussion of FIG. 3, user specification of flow groups is received, as shown in block 322. FIG. 8 is a screen shot of a flow group user interface 800 which provides the user the ability to create flow groups based on a plurality of packet protocol characteristics 840. The characteristics include the destination MAC address, the source MAC address, the type of Ethernet, the source address, the destination, and, pertinent here, TOS precedence 844.

Figure 9:
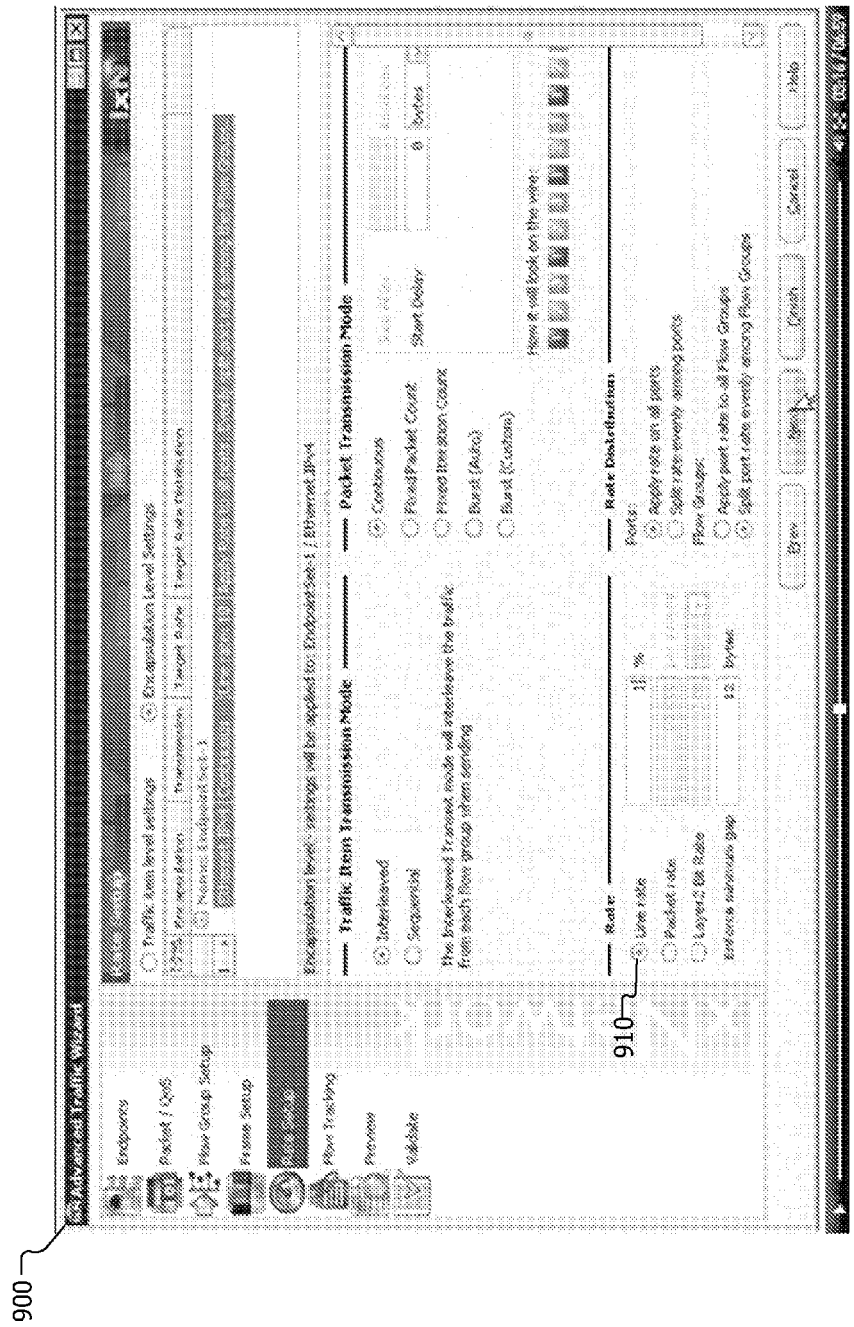
FIG. 9 is a screen shot of an example rate setup user interface.

Returning now to a discussion of FIG. 3, user specification of a rate is received, as shown in block 324. FIG. 9 is a screen shot of a rate setup user interface 900 that allows a user to specify a desired rate of network traffic. Depending on what aspects of the device under test is being evaluated, a slower rate that uses very little of available network bandwidth may be selected, such as, for example, a line rate of 1%, as shown. For other tests or in other circumstances, the rate may be anywhere from 1% to 100%. The selected rate percentage is user selected based on the capacity of the device under test and the testing goal. Some tests may be performed in stages where each stage has a different rate. For example, in a first stage, a low rate test at 1% may be specified by a user initially to verify that the remarking performed by the device under test occurs in compliance with an expected outcome. In this example, the user may select a second stage of tests that may include a dynamically increasing line rate Other sequences of testing scenarios may be user specified based on the capacity of the device under test, the protocols to be tested, the testing goal, and other factors to evaluate the device under test. The testing goal may be to evaluate whether there are any leaking (missing) packets that result from the remarking engine in the device under test.

Figure 10:
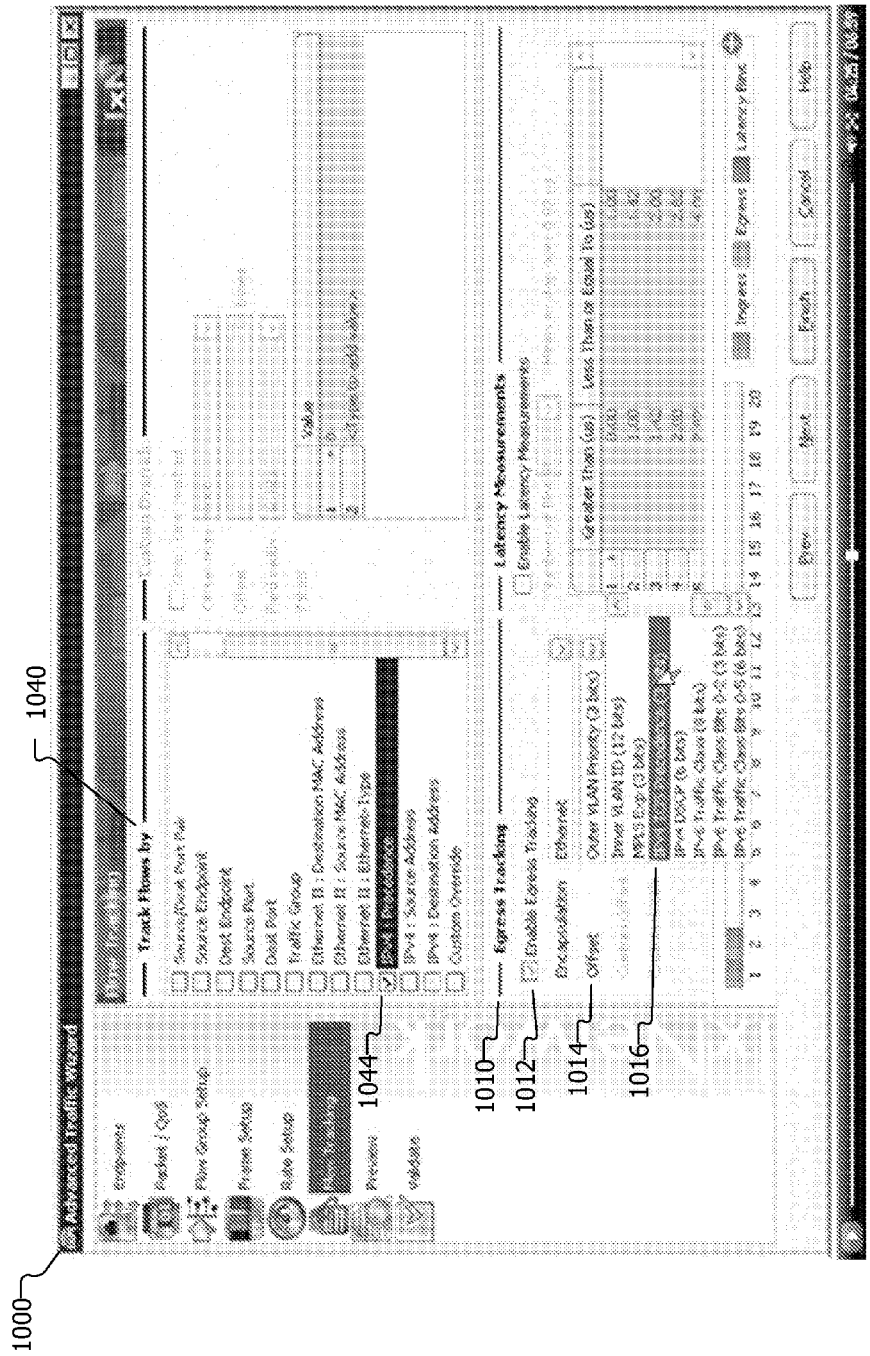
FIG. 10 is a screen shot of an example flow tracking user interface.

Returning now to a discussion of FIG. 3, a flow tracking specification from the user is received, as shown in block 326. FIG. 10 is a screen shot of a flow tracking user interface 1000. The user interface 1000 provides the user a plurality of ways to track flows. The flows are specified in the ingress tracking portion 1040 of the user interface 1000. The ingress tracking portion 1040 of the user interface 1000 provides the user the ability to specify the size and content of the ingress portion of the PGID of packets. The ingress portion of the PGID may be a user specified size that may conforms with the communications protocol to be tested to evaluated on the device under test. Example sizes of the ingress portion may be 12, 16, 17, 36, 40, 48, 64, and more bits. The example discussed herein involves precedence 1044 which may be specified along with other network header characteristics as a check box list or via another user interface construct. In addition to precedence, VLAN priority, VLAN service linkage, MPLS tunnel service linkage and fibre channel over Ethernet exchange or sequence misordering may be specified, as well as others depending on the device under test and the communications protocol to be tested.

In specifying the flow, the user interface 1000 allows the user to select various egress tracking criteria in an egress tracking pane 1010. Pertinent to the functionality provided is that the system provides the user the ability to enable egress tracking by selecting a check box 1012. The system allows the user to specify the size of an offset 1014 or egress portion of a PGID. The offset or egress portion of the PGID will be added or filed in by the device under test. Various sizes of the offset or egress portion of the PGID may be provided to the user by the system, based in part on the size of the PGID which may be based on the protocol being tested or used in the particular test. For example, a custom offset selection menu may be provided which allows a user to select the kind of protocol being tested and a bit size of the offset/egress portion of the PGID. The egress portion of the PGID may be any usable size, and is often between 3 and 12 bits. In the example IPv4 TOS precedence test, the PGID may be 3 bits as shown by item 1016.

Figure 11:
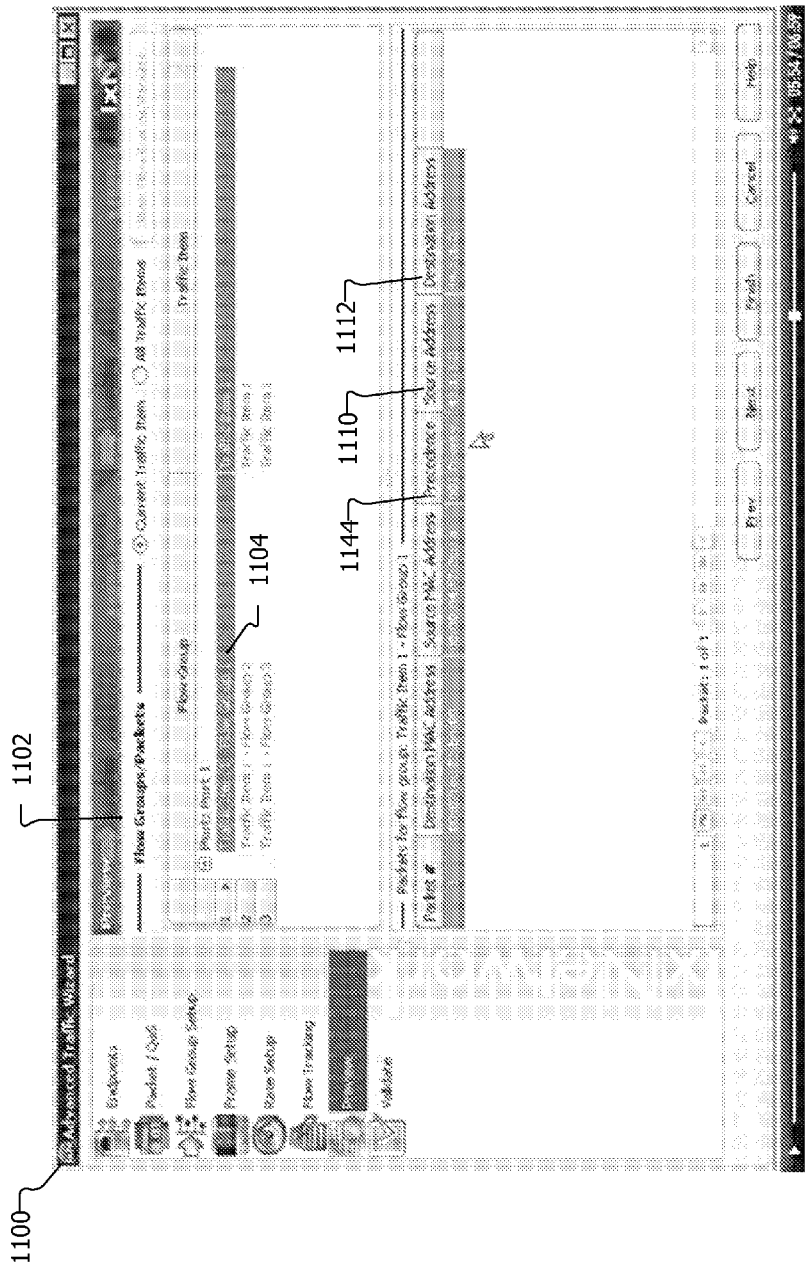
FIG. 11 is a screen shot of an example flow group preview user interface.

Returning now to a discussion of FIG. 3, a flow group preview is provided to the user, as shown in block 328. FIG. 11 is a screen shot of flow group preview user interface 1100. For the user selected flow group 1104 from s list of flow groups in a flow group pane 1102, the user interface provides pertinent user specified and/or system specified criteria for the flow, namely, for example, precedence 1144, source address 1110 and destination address 1112.

Figure 12:
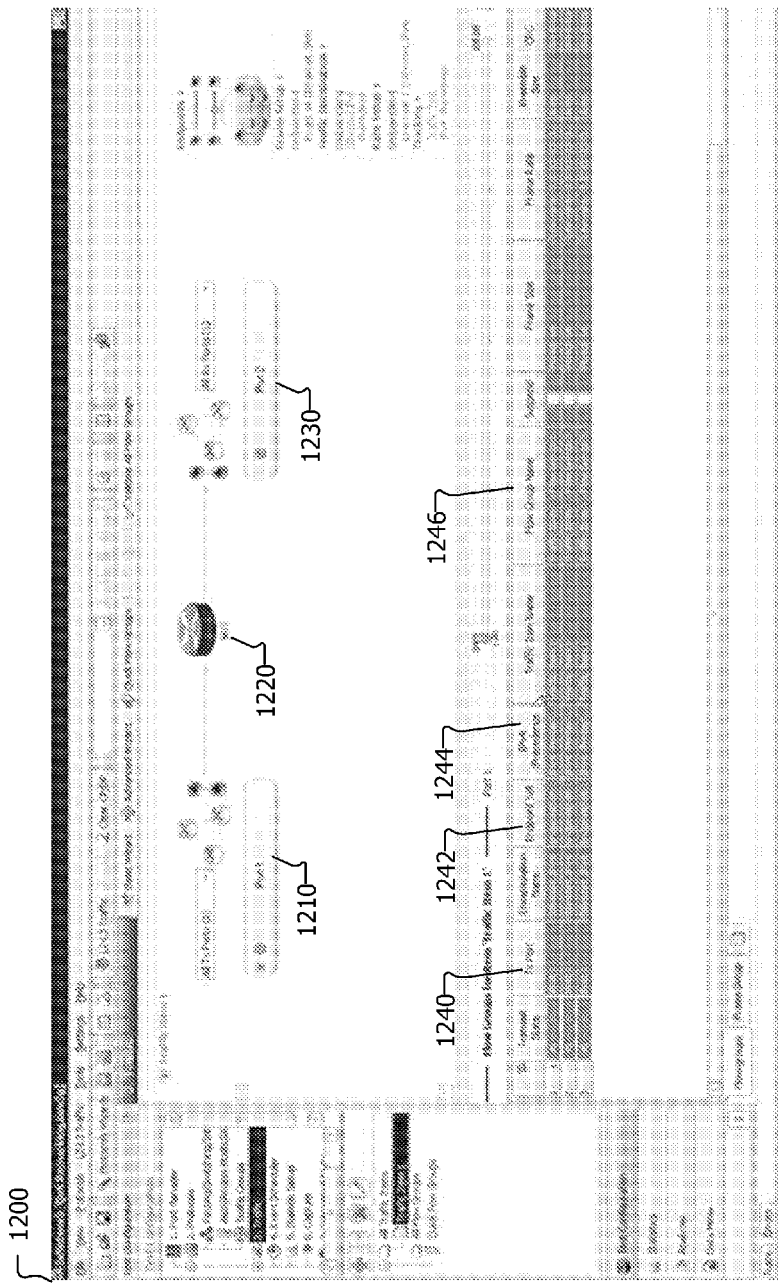
FIG. 12 is a screen shot of an example configuration summary user interface.

Returning now to a discussion of FIG. 3, a configuration summary screen is provided to a user, as shown in block 330. FIG. 12 is a screen shot of an example configuration summary user interface 1200. In an upper portion of the main pane of the interface 1200, a graphical representation of the endpoints and device under test may be provided. As shown, the main pane area in interface 1200 shows the user specified ports 1210 and 1230 connecting through device user test 1220. Pertinent information for each flow group for a selected port is provided in a lower portion of the main pane, including, for example, transmit port name 1240, precedence 1244, flow group name 1246, and others. In one embodiment, an endpoint set 1242 may be specified. The endpoint set allows a user to specify a set of associated source and destination endpoints as the network testing system may support testing between multiple source and destination endpoints through one or more devices under test.

Returning now to a discussion of FIG. 3, configuration information is written to the specified ports and the test is run in response to a user request to do so, as shown in block 332. That is, after information about the tests is specified, the IP addresses, and other pertinent information are written to the specified ports on the specified network cards. A user request to rune the user specified test is received, and the ports begin implementing the test. In the example, a first port sends data to a device under test specifying the second port as a destination.

As the test is being run, the network testing system stores various information about transmitted and received packets. The information stored and used for computing various statistics include the timestamps of sent and received packets, the size of sent and receive packets, and the PGID of sent and receive packets. The size may be stored, for example as bits or bytes. The timestamps may be obtained a near as possible to actual transmission or receipt to make resulting calculations as accurate as possible. The timestamps are obtained from or provided by a clock on the network cards in the network testing system. The clock may be a separate component or may be included in an FPGA or other device on the network card. Other information about sent and received packets may be stored depending on user specified criteria, system defaults and/or the communications protocols being evaluated or tested on the device under test. The information about packets may be stored or indexed based on PGIDs or other packet identifiers.

Figure 13:
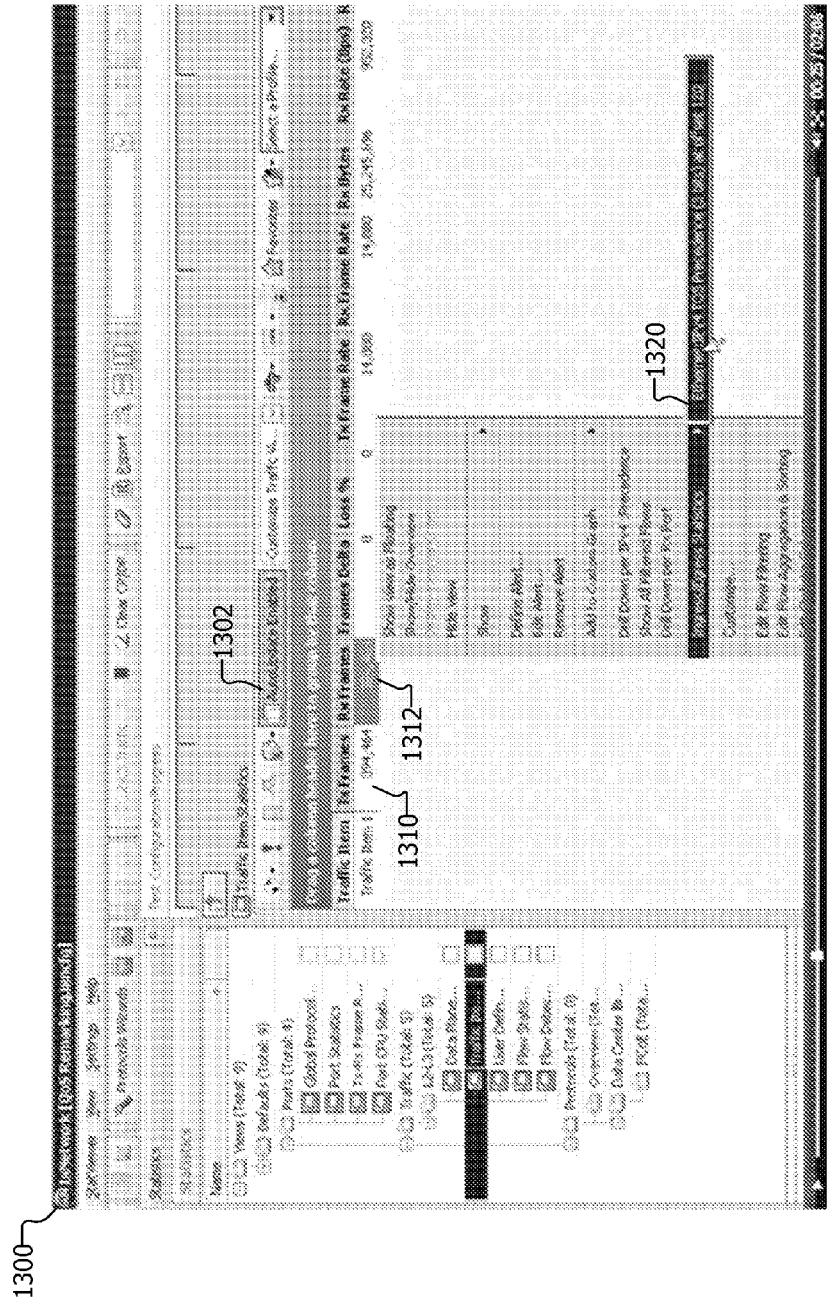
FIG. 13 is a screen shot of an example ingress statistics user interface.

As the test is being run, in real-time, ingress statistics may be provided to the user, as shown in block 334. FIG. 13 is a screen shot of an example ingress statistics user interface 1300. The user interface 1300 may provide a user with a plurality of information about packets being transmitted from a source endpoint or port to the device under test, referred to herein as ingress packets or ingress traffic. The information provided by the user interface includes the number of frames transmitted 1310, the number of frames received from the device under test 1312, the transmit rate and others. The user may elect to receive this information automatically in real-time by selecting an "autoupdate enabled" button 1310. Other user interface constructs may be used to allow a user to enable or disable automatic updating of ingress traffic information. The user interface 1300 allows the user to select from various viewing options from a pull down menu when certain data is right-clicked on, including displaying ingress/egress statistics 1320. Other user interface constructs may be used to provide these option to a user and to receive this user election.

Figure 14:
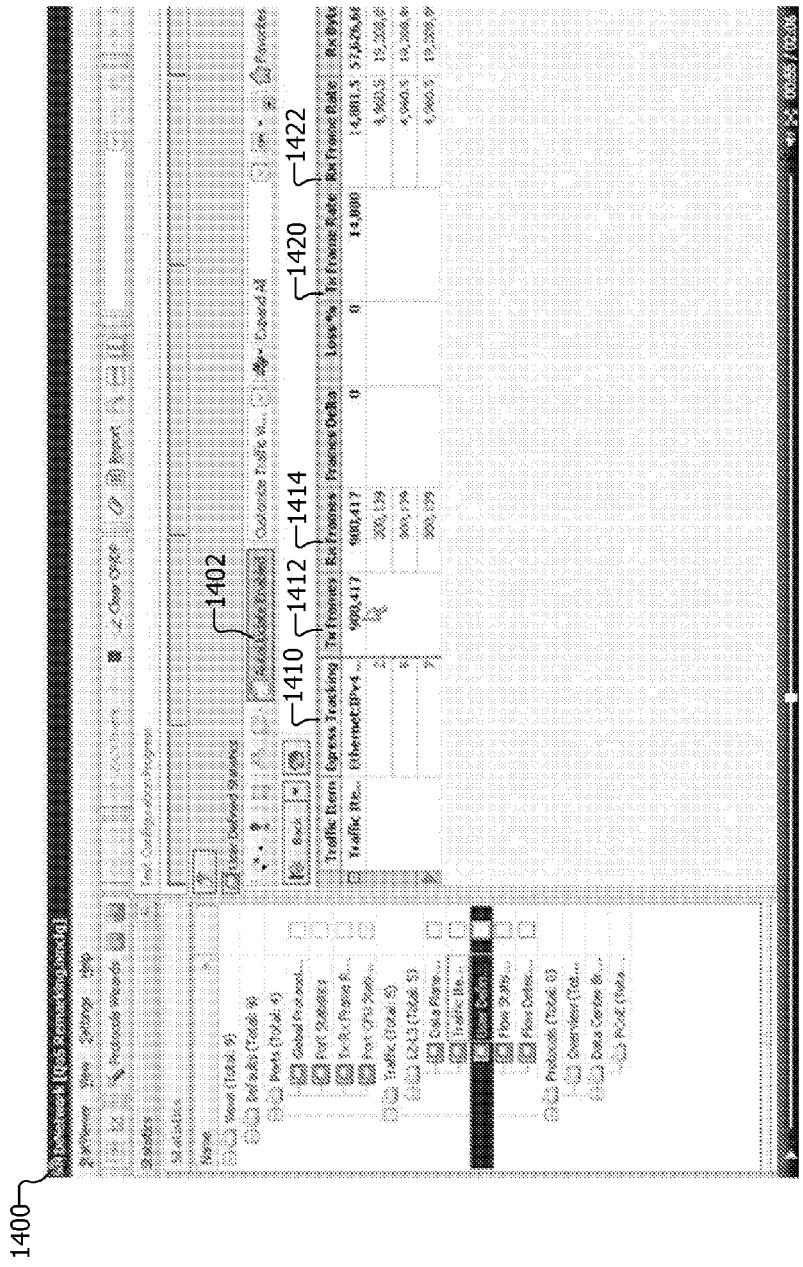
FIG. 14 is a screen shot of an example egress statistics user interface.

Returning now to a discussion of FIG. 3, egress statistics may be provided to the user, as shown in block 336. FIG. 14 is a screen shot of an example egress statistics user interface 1400. Egress statistics provide information about packets received by a destination endpoint after they have left, that is, have been transmitted by, a device under test. The user may elect to receive this information automatically in real-time by selecting an "autoupdate enabled" button 1402. Other user interface constructs may be used to enable or disable automatic updating of ingress traffic information. The egress statistics provided include egress tracking type 1410, such as precedence, transmitted number of frames 1412 (that is frames transmitted by a transmit port on the network testing system to a device under test), received number of frames 1414 (that is frames received by a receive port on the network testing system from a device under test) both total and per tracking ID (that is, PGID), transmit frame rate 1420, receive frame rate 1422 both total and per tracking ID (that is, PGID), and other information such as loss percentage, received number of bytes, transmitted number of bytes, and others. The difference between the number of transmitted frames and the number of received frames is used to compute the number of packets lost or currently in transmission, which may be provided in real-time or over a user specified period of time. The egress tracking information is provided per flow as shown in column 1410. In this example, flows having TOS 2, 5 and 7 are shown in separate rows, while the top row presents the total for each column of all egress packets received.

Figure 15:
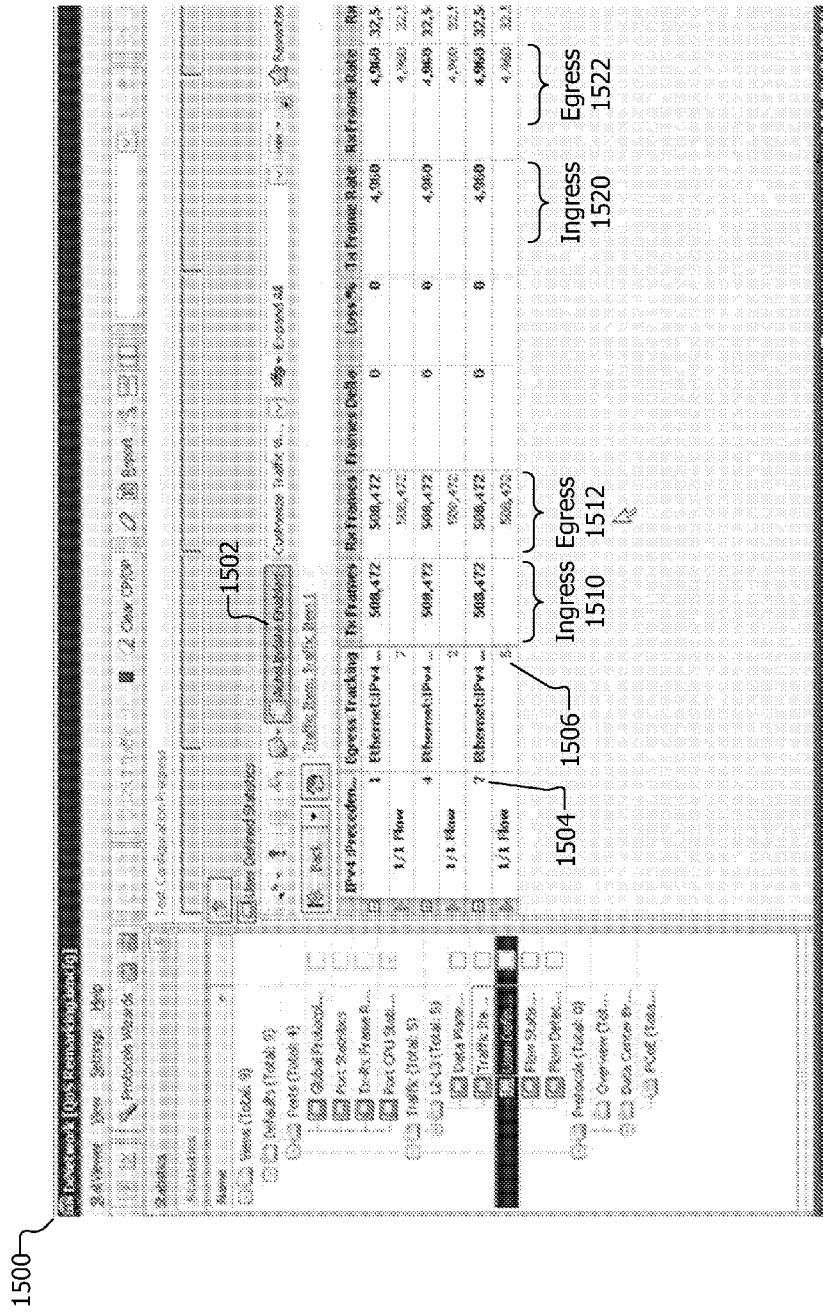
FIG. 15 is a screen shot of an example user interface providing both ingress and egress statistics.

Returning now to a discussion of FIG. 3, a single screen of information providing both ingress and egress statistics may be provided to a user, as shown in block 338. FIG. 15 is a screen shot of an example user interface 1500 providing both ingress and egress statistics side by side on a per flow basis based on the TOS value. The display may provide a column with the ingress flow identifiers 1504 and egress flow identifiers 1506. In this example, packets having a TOS value of 1 has been remarked to have a TOS value of 7, packets having a TOS packets 4 has been remarked to have a TOS packets 2 and packets having a TOS packets 7 have been remarked to have a TOS value of 5. Ingress and egress are from the reference point of the device under test. Ingress packets are received by the device under test from a transmit port and egress packets are transmitted or sent by a device under test to a receive port. Ingress statistics provide information about packets transmitted to a device under test after they have left, that is, have been transmitted by the source port. Egress statistics provide information about packets received by a destination endpoint after they have left, that is, have been transmitted by, a device under test. Various ingress and egress statistics may be calculated based on the timestamps of transmitted and received packets. Overall statistics about the functioning of the device under test may also be computed and displayed. These statistics include, for example, the number of frames transmitted, a transmit frame rate, the number of frames received, a receive frame rate, network latency, first packet transmitted timestamp, last packet transmitted timestamp, first packet received timestamp, last packet received timestamp, a receive throughput, bit rate or byte rate, received and transmitted byte counts.

The user may elect to receive statistics and related data automatically in real-time by selecting an "autoupdate enabled" button 1402. The egress statistics provided include a selection of egress tracking type 1410, such as precedence, transmitted number of frames 1412, received number of frames 1414 both total and per tracking ID (that is, PGID), transmit frame rate 1420, receive frame rate 1422 both total and per tracking ID (that is, PGID), and other information such as loss percentage, received number of bytes, transmitted number of bytes, and others. Other user interface constructs may be used to enable or disable automatic updating of ingress traffic information.

The real-time monitoring and display of ingress and egress statistics by a network testing system as described herein allows a user, manufacturer or seller of a device under test to readily see how the device under test is performing.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more.

As used herein, a "set" of items may include one or more of such items.

As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

As used herein, "and/or" means that the listed items are alternatives, but the alternatives also include any combination of the listed items.

It is claimed:

1. A network testing system having at least one network card, each network card including a processor, a memory and at least one network communications unit, the network testing system coupled with a network to which a device under test is also coupled, the network testing system coupled with a display, the network testing system having instructions stored thereon which when executed cause the network testing system to perform operations comprising:

receiving user selection to create a network device test receiving test information for the network device test from the user, the test information including user specification of a source port, a destination port, a program group identifier specification for at least one flow, the program group identifier specification including an ingress portion and an egress portion, and at least one user specified terms of service value receiving user selection to execute the network device test executing the network device test, causing packets to be sent from the source port to the destination port through the device under test displaying in real-time both ingress statistics and egress statistics for the network device test, including displaying the ingress packet data and egress packet data according to the program group identifier for at least one flow and the user specified terms of service value.

2. The network testing system of claim 1 wherein the ingress statistics include a number of frames transmitted and a transmit frame rate and the egress statistics include a number of frames received and a receive frame rate.

3. The network testing system of claim 1 wherein the ingress statistics and the egress statistics include a network latency, a first packet transmitted timestamp, a last packet transmitted timestamp, a first packet received timestamp and last packet received timestamp, a receive throughput.

4. The network testing system of claim 1 wherein the source port is included in a first network card of the network testing system and the destination port is included in a second network card of the network testing system.

5. The network testing system of claim 1 wherein the source port and the destination port are included in a single network card of the network testing system.

6. The network testing system of claim 1 having further instructions stored thereon which when executed cause the network testing system to perform further operations comprising:

storing timestamps for packets received from the device under test storing timestamps for packets transmitted to the device under test.

7. The network testing system of claim 1 wherein the device under test is selected from the group including a router, a switch, a load balancer, a hub, and a firewall.

8. A method performed by a network testing system having at least one network card, each network card including a processor, a memory and at least one network communications unit, the network testing system coupled with a network to which a device under test is also coupled, the network testing system coupled with a display, the network testing system performing operations comprising:

receiving user selection to create a network device test receiving test information for the network device test from the user, the test information including user specification of a source port, a destination port, a unique identifier for at least one flow, and at least one user specified terms of service value receiving user selection to execute the network device test executing the network device test, causing packets to be sent from the source port to the destination port through the device under test displaying in real-time both ingress statistics and egress statistics for the network device test, including displaying the ingress packet data and egress packet data according to the unique identifier and the user specified terms of service value.

9. The method of claim 8 wherein the ingress statistics include a number of frames transmitted and a transmit frame rate and the egress statistics include a number of frames received and a receive frame rate.

10. The method of claim 8 wherein the ingress statistics and the egress statistics include at least two of a network latency, a first packet transmitted timestamp, a last packet transmitted timestamp, a first packet received timestamp and last packet received timestamp, a receive throughput.

11. The method of claim 8 wherein the device under test is selected from the group including a router, a switch, a load balancer, a hub, and a firewall.

12. The method of claim 8 wherein the unique identifier is a program group identifier specification, the program group identifier specification including an ingress portion and an egress portion.

13. A storage medium included with a network testing system having at least one network card, each network card including a processor, a memory and at least one network communications unit, the network testing system coupled with a network to which a device under test is also coupled, the network testing system coupled with a display, the storage medium having instructions stored thereon which when executed cause the network testing system performing operations comprising:

receiving user selection to create a network device test receiving test information for the network device test from the user, the test information including user specification of a source port, a destination port, a unique identifier for at least one flow, and at least one user specified terms of service value receiving user selection to execute the network device test executing the network device test, causing packets to be sent from the source port to the destination port through the device under test displaying in real-time both ingress statistics and egress statistics for the network device test, including displaying the ingress packet data and the egress packet data according to the unique identifier and the user specified terms of service value.

14. The storage medium of claim 13 wherein the ingress statistics include a number of frames transmitted and a transmit frame rate and the egress statistics include a number of frames received and a receive frame rate.

15. The storage medium of claim 13 wherein the ingress statistics and the egress statistics include at least two of a network latency, a first packet transmitted timestamp, a last packet transmitted timestamp, a first packet received timestamp and last packet received timestamp, a receive throughput.

16. The storage medium of claim 13 wherein the device under test is selected from the group including a router, a switch, a load balancer, a hub, and a firewall.

17. The storage medium of claim 13 wherein the unique identifier is a program group identifier specification, the program group identifier specification including an ingress portion and an egress portion.

* * * * *